H. H. HUNGERFORD.
LOAF PRESSING MACHINE.
APPLICATION FILED MAR. 12, 1917.
1,256,695.
Patented Feb. 19, 1918.
4 SHEETS—SHEET 1.
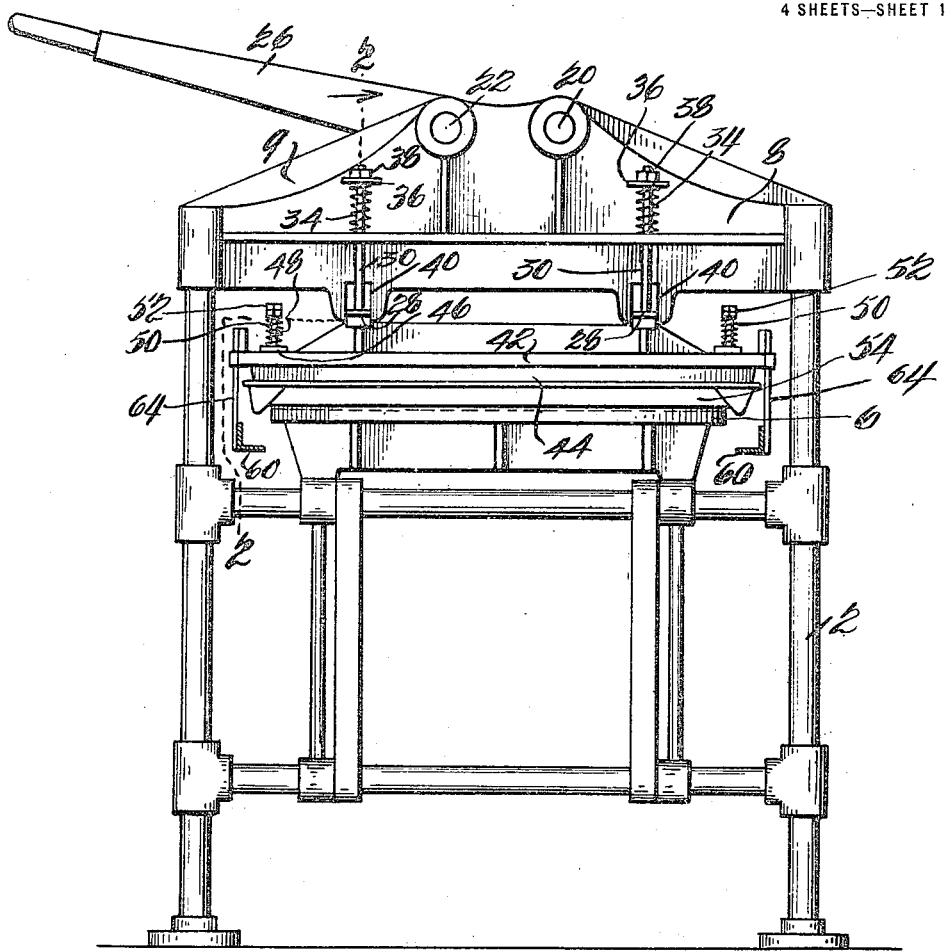
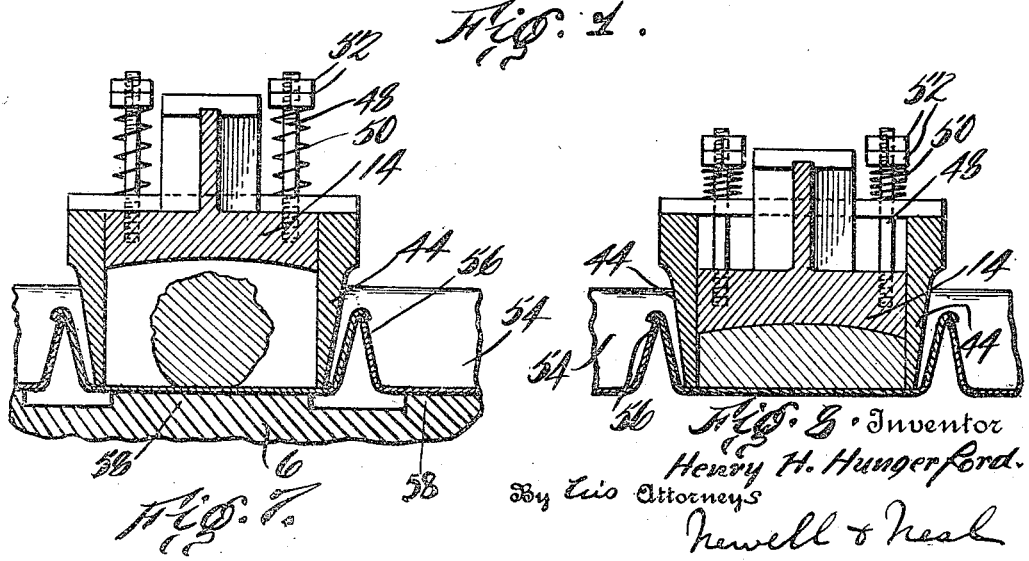
Inventor
Henry H. Hungerford.
By his Attorneys
Newell & Neal

H. H. HUNGERFORD.
LOAF PRESSING MACHINE.
APPLICATION FILED MAR. 12, 1917.

1,256,695.

Patented Feb. 19, 1918.
4 SHEETS—SHEET 2.

Inventor
Henry H. Hungerford
By his Attorneys
Newell & Neal

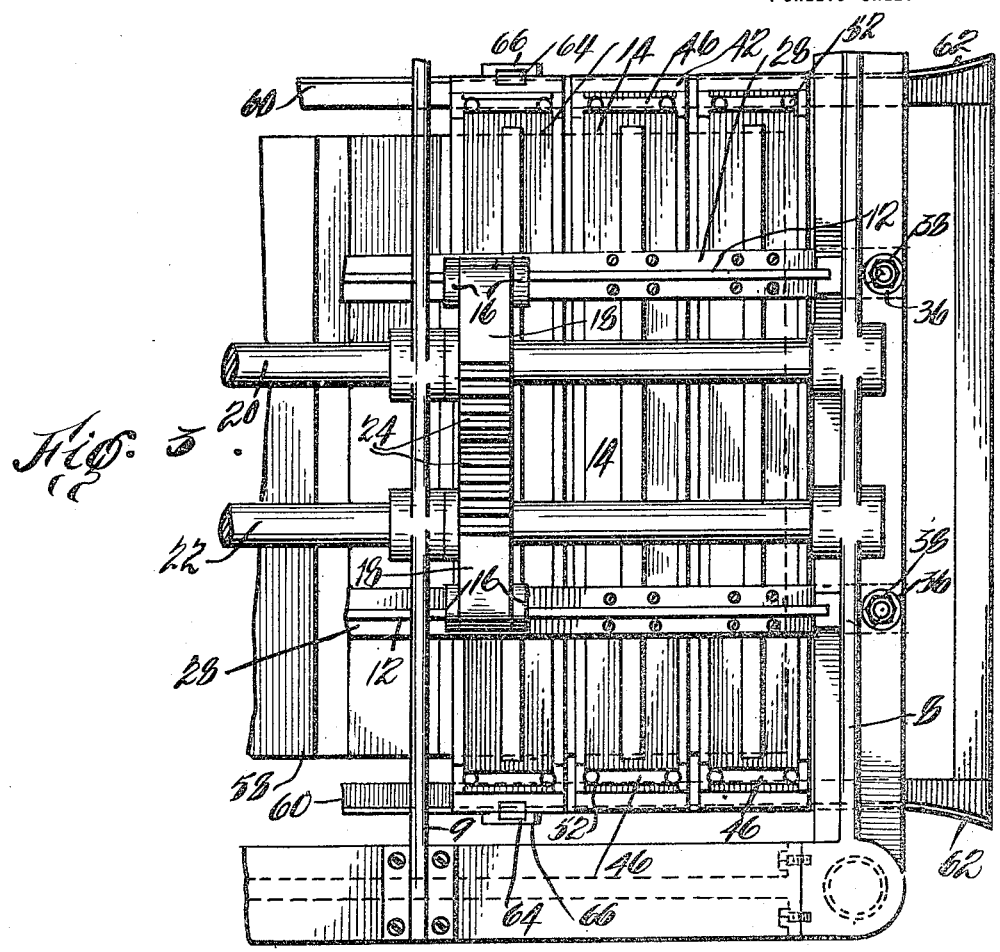

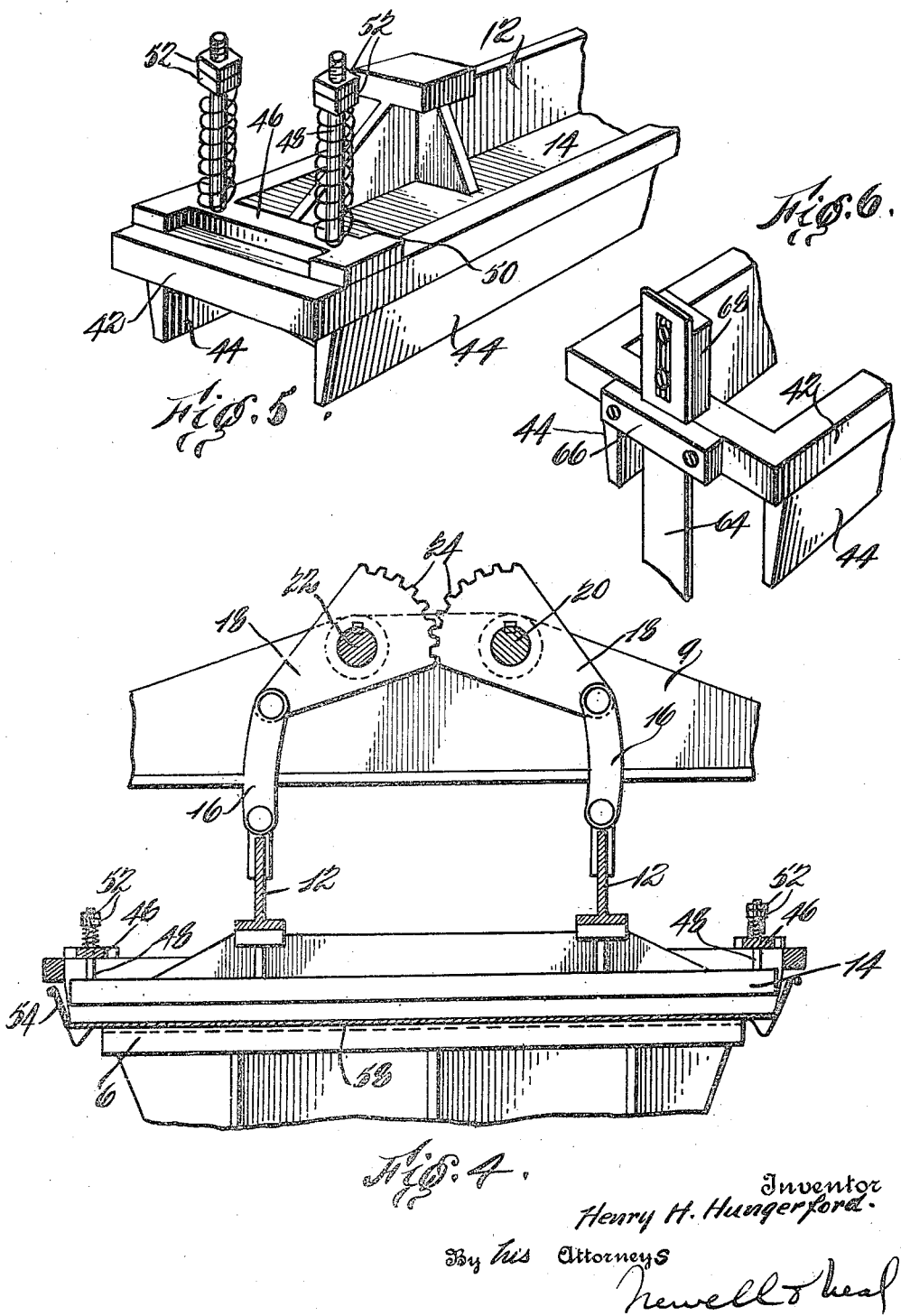

UNITED STATES PATENT OFFICE.

HENRY H. HUNGERFORD, OF CHICAGO, ILLINOIS, ASSIGNOR TO NATIONAL BISCUIT COMPANY, OF JERSEY CITY, NEW JERSEY, A CORPORATION OF NEW JERSEY.

LOAF-PRESSING MACHINE.

1,256,695.  Specification of Letters Patent.  Patented Feb. 19, 1918.

Application filed March 12, 1917. Serial No. 154,175.

*To all whom it may concern:*

Be it known that I, HENRY H. HUNGERFORD, a citizen of the United States, residing at Chicago, Illinois, have invented certain new and useful Improvements in Loaf-Pressing Machines, of which the following is a clear, full, and exact description.

This invention relates to machines for use in the making of bakery products, and particularly to machines for treating and shaping loaves of bread or the like preparatory to baking.

In the making of the bread or rusk known as zwieback, which is baked in a loaf and then cut into slices and rebaked or toasted, difficulty has been experienced heretofore in the production either of uniform loaves or of loaves which individually were of such evenness that they could be cut into substantially uniform slices and without much waste at the ends. The principal cause of this difficulty has been the uneven distribution through the loaf of the leavening gas, of which there is a great quantity in the sponge dough from which zwieback is made.

A particular object of this invention, therefore, is to provide a machine for so treating the loaves of zwieback, or other bread or the like, before baking, that the uneven distribution of the leavening gas through the loaf will be corrected, and that where there is an excess of this gas in the loaf it will be driven out, thus giving to the loaf a uniform consistency. The invention aims also so to shape the loaf, while its consistency is being made uniform, that when baked it may be cut with a minimum of waste.

Other objects and important features of the invention will appear from the following description and claims when considered in connection with the accompanying drawings, in which—

Figure 1 is an end elevation of a machine embodying the invention, the operating parts being in the position illustrated in detail in Fig. 7 of the drawings;

Fig. 3 is a plan view of one end of the machine;

Fig. 4 is a vertical section on the line 4—4 of Fig. 2;

Fig. 5 is a perspective detail illustrating the connection between the loaf confining follower and one of the presser members;

Fig. 6 is a perspective detail of one of the followers illustrating the means for supporting the pan guide;

Fig. 7 is a section through one of the presser members and its associated follower, showing the position of these parts in the baking tin just prior to the pressing operation;

Fig. 8 is a view similar to Fig. 7, showing the relative positions of the parts at the end of the pressing operation; and Fig. 9 is a detail view in end elevation, showing the baking tin guide as it appears just after the tin has been inserted in the machine and before the operation of the machine begins.

Figure 2:
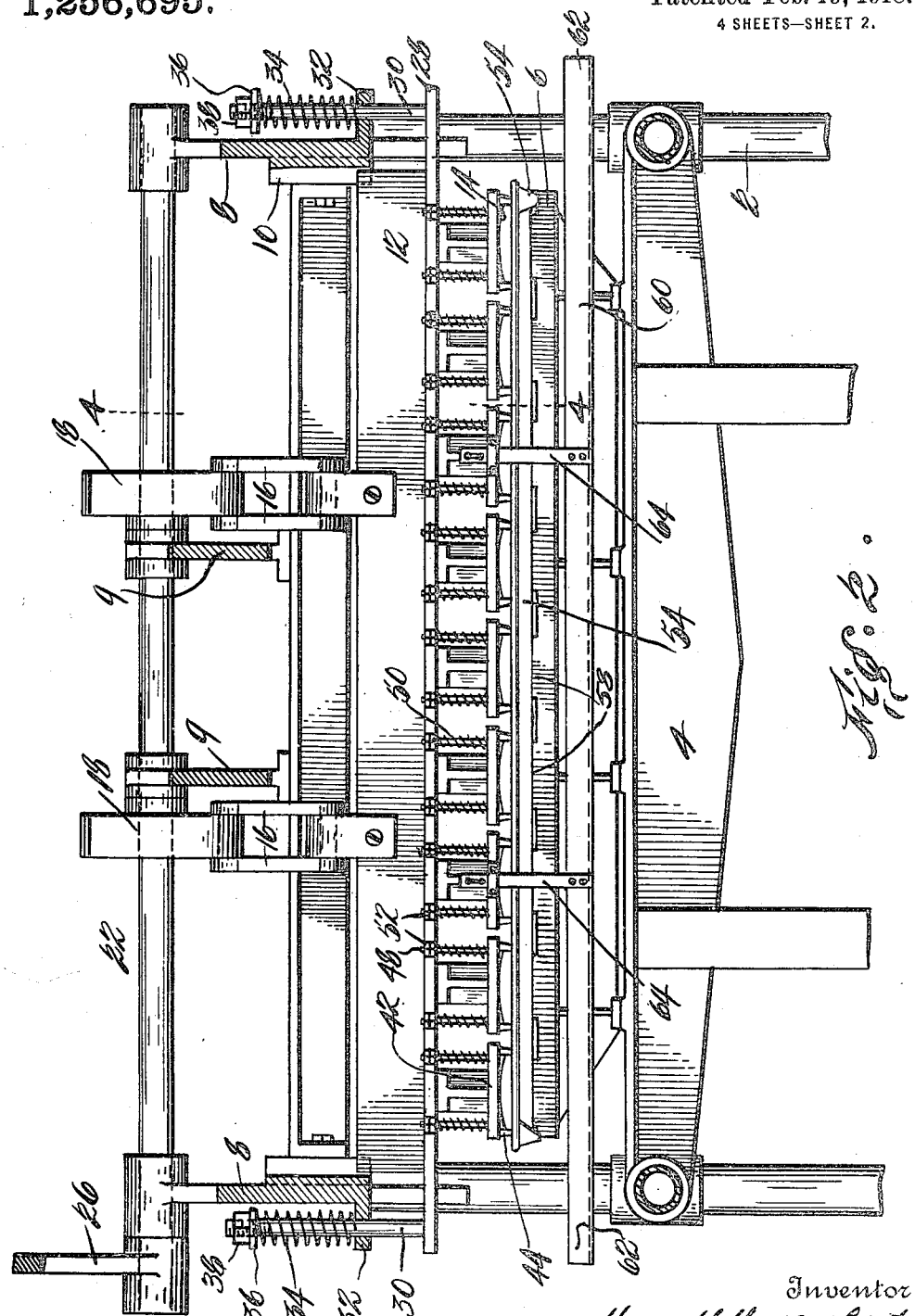
Fig. 2 is a longitudinal section through the machine on the line 2—2 of Fig. 1.

The illustrated machine comprises a frame 2 which, for the sake of cleanliness, is of substantially open construction, this frame comprising longitudinal bars 4 supporting a bed or baking tin support 6. At each end of the frame, above the plane of the bed 6, is a cross-head 8, having upon its inner face vertical guideways 10 for the vertical webs 12 of a pair of T-bars extending between the heads 8 and supporting a series of transversely arranged presser members 14.

Each of the T-bars is connected by links 16 to one arm of a lever 18 attached to one of two parallel rock shafts 20, 22, extending lengthwise of the machine and having bearings in the heads 8 and in cross-pieces 9, the other arms of the levers 18 being provided with intermeshing teeth 24, whereby the two levers 18 are geared together to rock together when one or the other of the shafts 20 or 22 is rocked. In order to effect the vertical movement of the presser members, the rock shaft 22 is provided upon one end, outside the head 8, with an operating handle 26, by which it may be rocked, this handle being long enough to afford considerable leverage. The handle 26 is preferably arranged to effect the pressing movement of the presser members, the return movement being preferably effected automatically, although of course the handle 26 may be used to effect both movements if desired. In order to effect the return movement of the presser members, each of the horizontal portions 28 of the T-bars, which support the presser members, is preferably extended at its ends and is provided with a vertical stud 30 guided in an opening in a horizontal flange 32 upon the head 8, a spring 34 being confined between this flange and a washer 36 which rests against the underside of a nut 38 threaded upon the upper end of the stud 30. As shown in the drawings, there are four of these studs, one at each end of the T-bars and the extensions of the horizontal flanges 28 of the T-bars are guided in slots 40 in the heads 8.

As shown in Figs. 2, 7 and 8, the pressing face of each of the presser members is slightly concave in the transverse dimension only, and each presser member is guided within a loaf confining follower 42 comprising a rectangular frame embracing the sides and the ends of the presser member 14, this frame having downwardly projecting tapering members 44 adapted to enter between the loaf and the sides of the compartment, as shown in Fig. 7 of the drawings, these members preferably extending only along the sides and not across the ends of the tin, whereby any excess of dough in any of the loaves may be forced out at the end, thus making the loaves of uniform size.

In order to maintain the loaf confining members 44 in projected relation to the presser members 14, each of the followers 42 is provided near each end with a cross piece 46 through which extends a pair of vertical studs 48 connected to the presser member 14, a spring 50 surrounding each stud being confined between the cross piece 46 and a pair of lock nuts 52 threaded upon the stud. The action of the springs 50 upon the cross pieces 46 and upon the nuts 52 tends to maintain the followers 42 in their lowermost position, that is, with the underfaces of the cross pieces 46 in engagement with the upper face of the presser member 14.

The baking tins 54, in which the zwieback is baked, are formed, as shown in Figs. 7 and 8, with a series of loaf compartments separated by interlocking partitions 56, and the support 6 for the baking tin has opposed to the respective presser members projecting tin engaging portions 58 of such dimensions that they lie between the planes of the inside faces of the members 44, whereby when the follower is in the position shown in Figs. 7 and 8 of the drawings, the lower edges of the members 44 tend to force the bottom of the tin 54 down upon either side of the tin engaging part 58 of the support 6. By this construction the positive clamping of the tin in position for the pressing operation is insured regardless of any tendency of the tin to buckle.

The baking tins with the loaves of zwieback dough, of substantially the cross section shown in Fig. 7, are introduced into the machine endwise, and to facilitate the introduction of the tins into the machine, and particularly to avoid interference from the projecting parts 58 of the support 6, a tin guide is provided, the illustrated guide comprising suspended tracks 60 which flare at their outer ends at 62, as shown in Fig. 3 of the drawings, to facilitate the location of the tin upon the tracks, there being a track 60 for each side of the tin, and the tracks being suspended by links 64 from the followers.

As shown in Figs. 4 and 6 of the drawings, there are two of these suspending links which are connected by guide straps 66 and adjustable blocks 68 with two of the followers 42. The straps 64 are of such length that when the presser members are in their uppermost position, determined by the engagement of the horizontal flanges 28 with the underside of the flanges 32, the tracks will be supported above the tin supporting bed 6 and will support the tin above this bed. The tin 54 is of such width that it projects over the sides of the bed 6 when in the position shown in Fig. 9, and the tracks 60 are so spaced apart that they will embrace the bed 6 when the presser members are moved toward their lowermost positions, and therefore when the downward movement of the presser members takes place the tracks 60 are moved into tin depositing relation to the tin support 6 and then continue to move downward away from the tin until the followers, to which they are connected, engage the bottom of the tin with their loaf confining members 44.

From the foregoing description of the separate elements of the invention, the operation of the machine as a whole will be understood. It will be noted that the illustrated machine shows a series of nine presser members with their associated loaf confining followers, and, accordingly, the tin employed with this machine will preferably have nine loaf compartments in each of which a loaf of the zwieback dough as it comes from the loaf forming machine will be placed, the cross section of this loaf at this time being approximately circular and the loaf usually tapering somewhat toward its ends. It will be understood, of course, that any convenient number of presser members may be incorporated in one machine, the number preferably corresponding with the number of compartments in the tins employed.

The loaf of zwieback dough before the pressing operation, as hereinabove suggested, usually contains a great quantity of leavening gas and this gas is unevenly distributed throughout the loaf. If the loaf is baked without being subjected to the pressing operation, the resultant product will vary considerably in its cross section from one end to the other, and the different loaves will lack uniformity of size and shape, thus preventing the production of a uniform and commercially attractive slice for the rebaking operation. Moreover, a considerable portion of each loaf near its ends will necessarily be wasted in the slicing operation.

The tin of loaves of zwieback dough as they come from the loaf forming machine is introduced into the loaf pressing machine in the manner hereinabove described, being slid into the machine upon the tracks 60, and when it is in proper position beneath the presser members, the handle 26 is depressed, thus rocking the shaft 22 in one direction, and through the teeth 24 rocking the shaft 20 in the other direction, and through the levers 18 and links 16 lowering the presser members 14 with their associated followers 42 until the loaf embracing members 44 of the respective followers come into engagement with the bottom of the tin 54 in the respective compartments and into embracing relation to the loaves in said compartments. Further downward movement of the handle or lever 26 causes the presser members 14 through the springs 50 to press the members 44 of the followers 42 tightly against the bottoms of the compartments in the tin 54 and then the presser members move downward relatively to the followers 42 into engagement with the loaves and press the loaves out in the manner shown in Fig. 8 of the drawings, the loaf being squeezed out until it fills out the space between the presser member and the sides of each follower.

Since the confining members 44 of the followers do not extend across the ends of the loaves, if the amount of material in any loaf is greater than the space provided, the excess which will usually be very small, may be squeezed out at the end, thus insuring that, between the ends, all of the loaves will be of substantially uniform cross section. At the end of the pressing operation, the operator releases the handle or lever 26, and the springs 34 tend to raise the presser members to their uppermost position, the springs 50 holding the members 44 down in engagement with the bottoms of the compartments of the tin until the presser members 14 have moved out of engagement with the compressed loaves, the followers 42 being picked up by the presser members 14 as said presser members again come into engagement with the cross pieces 46 of the said followers. The return movement of the presser members can of course be accelerated by lifting the handle or lever 26. As the presser members and followers again return to their uppermost position, the tracks 60 are carried up by the links 64 and the tin 54 is raised from the bed 6, thus bringing it into position to be easily removed from the machine by sliding it along the tracks 60.

What I claim as new is:

1. In a loaf pressing machine, the combination with positively operating pressing means and an opposed baking tin support, of means yieldingly projected into embracing relation to the loaf in the tin in advance of the engagement of the loaf by the pressing means for laterally confining the loaf during the pressing operation, said means being arranged to clamp the baking tin upon its support.

2. In a loaf pressing machine, the combination with pressing means and an opposed baking tin support, of means located beyond the edges of said support for laterally confining the loaf in the tin during the pressing operation and for confining said tin upon the support, said means being adapted to enter between the loaf and the sides of the tin, and said pressing means fitting within said confining means.

3. In a loaf pressing machine, the combination with means for positively pressing the loaf, of spring-projected confining means carried by said pressing means and movable thereby into lateral confining relation to the loaf in advance of the engagement of the loaf by the pressing means.

4. In a loaf pressing machine, the combination with means for positively pressing the loaf, of a baking tin support opposed to said pressing means, loaf confining means embracing said pressing means and movable thereby, and a spring connection between said pressing means and said confining means arranged to transmit tin clamping pressure from said pressing means to said confining means.

5. In a machine of the class described, the combination with a presser member and means for effecting a positive pressing movement of said member, of means movable by said presser member into lateral confining relation to the material to be pressed, and a lost motion connection between said means and said presser member, comprising resilient means for transmitting a portion of the pressing force to said confining means.

6. In a loaf pressing machine, the combination with positively operating loaf pressing means and an opposed baking tin support, of loaf confining means carried by said pressing means and movable relatively thereto along the line of the pressing movement during the pressing operation, and resilient means for projecting said confining means toward said support with respect to said pressing means.

7. In a loaf pressing machine, the combination with pressing means, of an opposed baking tin support, and means movable into engagement with the bottom of the baking tin and into embracing relation to the loaf in said tin in advance of the pressing means for laterally confining the loaf during the pressing operation, said confining means engaging the bottom of said tin beyond the edges of the tin supporting surface of said tin support.

8. In a loaf pressing machine, the combination with loaf pressing means and a follower embracing said pressing means and movable thereby into engagement with the bottom of the baking tin and into lateral confining relation to the loaf to be pressed in advance of the pressing operation, of a baking tin support opposed to said pressing means and said follower engaging the bottom of the tin beyond the edges of the tin supporting surface of said tin support.

9. In a machine of the class described, the combination with a positively acting presser member, of means, carried by said presser member and having a lost motion connection therewith, for engaging the bottom of a baking tin and laterally confining the material to be pressed, a baking tin support opposed to said presser member and lying between the planes of the sides of said confining means, and means for transmitting a portion of the force exerted upon the presser member to cause said confining means to clamp said tin tightly upon its support.

10. In a loaf pressing machine, the combination with loaf pressing means and an opposed baking tin support upon which the tin is deposited for the pressing operation, of a baking tin guide arranged to guide said tin between the pressing means and the support, and means for effecting a relative movement of said guide and said support into tin depositing relation in advance of the pressing operation.

11. In a loaf pressing machine, the combination with a vertically movable presser member and a baking tin support opposed to said presser member, of a horizontal baking tin guide located between said presser member and said support in a position to guide the tin freely between said presser member and said support, and movable with said presser member into tin depositing relation to said support.

12. In a loaf pressing machine, the combination with a plurality of presser members, of a baking tin support comprising coöperating projections opposed to the respective presser members, and a baking tin guide arranged to guide the baking tin freely between said presser members and said support and movable in advance of the pressing operation into tin depositing relation to said support.

13. In a loaf pressing machine, the combination with a presser member and an opposed baking tin support, of loaf confining means carried by and having a lost motion connection with said presser member, and a baking tin guide connected to said loaf confining means and arranged to guide said tin freely between said presser member and said support when said parts are in separated relation.

14. In a loaf pressing machine, the combination with a baking tin shaped to produce an elongated rectangular loaf, of a tin support, and pressing means coöperating with said support to press the loaf in said tin, said pressing means having its loaf engaging face concaved in its transverse dimension only, and means movable into lateral supporting relation to the elongated sides only of said loaf for clamping said tin upon said support and for laterally confining said loaf throughout the pressing operation.

15. In a loaf pressing machine, the combination with a baking tin having a plurality of loaf compartments, of a tin support, a plurality of presser members arranged to engage the loaves in the respective tin compartments, means for effecting a simultaneous relative pressing movement of said support and said presser members, and means yieldingly projected from the individual presser members and brought into operative position by said relative movement for independently clamping the tin adjacent to the separate loaves and for laterally confining the loaves in the compartments throughout the pressing operation.

16. In a loaf pressing machine, the combination with a baking tin having a series of loaf compartments and a tin support, of means coöperating with said support for positively and simultaneously pressing out the loaves in said compartments, comprising a corresponding series of presser members, and means separate from said tin and yieldingly projected from the respective presser members for locally clamping the tin and laterally confining the loaves in the respective compartments throughout the pressing operation.

17. In a machine of the class described, a plurality of presser members, a support having a projection opposed to each presser member, means coöperating with the respective presser members and opposed to the spaces between said projections for laterally confining the material operated on by said presser members, a baking tin spanning the spaces, and means for effecting relative movement of said aforementioned parts into and out of coöperative relation to each other.

18. In a loaf pressing machine, the combination with a plurality of presser members and a baking tin support, comprising spaced supporting surfaces opposed to the respective presser members, of means embracing the presser members and opposed to the spaces between said surfaces for laterally confining the loaves to be pressed during the pressing operation.

19. In a loaf pressing machine, the combination with a plurality of presser members and a baking tin support, comprising spaced supporting surfaces opposed to the respective presser members, of a baking tin spanning the spaces between said surfaces, and means carried by and yieldingly projected in advance of the presser members and opposed to said spaces for clamping said tin and laterally confining the loaves in the tin during the pressing operation.

Signed at Chicago, Ill., this 24th day of February, 1917.

HENRY H. HUNGERFORD.

Witnesses:
 ARTHUR C. BEHN,
 ERNEST W. WILSON.

Copies of this patent may be obtained for five cents each, by addressing the "Commissioner of Patents, Washington, D. C."